United States Patent
Maslowski

(10) Patent No.: US 6,959,831 B2
(45) Date of Patent: Nov. 1, 2005

(54) GASKETLESS DRUM

(75) Inventor: Edward M. Maslowski, Burbank, IL (US)

(73) Assignee: Greif, Inc., Delaware, OH (US)

( * ) Notice: Subject to any disclaimer, the term of this patent is extended or adjusted under 35 U.S.C. 154(b) by 0 days.

(21) Appl. No.: 09/899,270

(22) Filed: Jul. 6, 2001

(65) Prior Publication Data
US 2003/0006234 A1 Jan. 9, 2003

(51) Int. Cl.[7] .................. B65D 43/06; B65D 45/34; B65D 53/02
(52) U.S. Cl. .................... 220/320; 220/321
(58) Field of Search .................. 220/319, 214, 220/780, 781, 782, 795, 320, 321, 315, 378, 220/796

(56) References Cited

U.S. PATENT DOCUMENTS

| | | | |
|---|---|---|---|
| 3,664,544 A * | 5/1972 | Hammes | 220/320 |
| RE28,521 E * | 8/1975 | Hammes | 220/784 |
| 3,942,677 A * | 3/1976 | Hagen et al. | 220/304 |
| 4,177,934 A * | 12/1979 | Hammes et al. | 220/319 |
| 4,347,947 A * | 9/1982 | Hammes | 220/378 |
| 4,674,650 A * | 6/1987 | Hamilton et al. | 220/319 |
| 4,744,486 A * | 5/1988 | Godinho | 220/319 |
| 4,880,138 A * | 11/1989 | Pfeiffer et al. | 220/320 |
| 4,955,504 A * | 9/1990 | Lesscher | 220/321 |
| 5,573,118 A * | 11/1996 | Cramer et al. | 206/505 |
| 5,823,340 A * | 10/1998 | Maihofer | 206/370 |
| 5,947,320 A * | 9/1999 | Bordner et al. | 220/321 |
| 6,019,240 A * | 2/2000 | Legeza | 220/321 |
| 6,401,957 B1 * | 6/2002 | Przytulla | 220/319 |

* cited by examiner

Primary Examiner—Nathan J. Newhouse
Assistant Examiner—Niki M. Eloshway
(74) Attorney, Agent, or Firm—Baker & Hostetler LLP

(57) ABSTRACT

A reusable sealable plastic drum incorporates
  a plastic drum body with a convex upper chime having a convex chime radius,
  a plastic lid having an annular, peripheral mating channel sized to accept the upper chime, the channel having an inner wall, an outer wall, a mouth for receiving the upper chime, and a base surface for engaging the upper chime, the base surface having a concave radius, which is matched to the convex chime radius, and
  a lockband surrounding the outer wall.

Tightening of the lockband causes the concave base radius to fully engage the convex chime radius in a sealing relationship.

11 Claims, 3 Drawing Sheets

GASKETLESS DRUM

BACKGROUND OF THE INVENTION

1. Field of the Invention

This invention relates to drums made of synthetic resins and more particularly to such plastic drums that can be sealed by a gasketless lid or cover so as to prevent air and water vapor from entering the closed drum.

2. Brief Description of the Prior Art

Drums and similar containers made from synthetic resin have come to be used extensively in storage and shipment of granular materials of all types. Such drums are inexpensive, durable, and corrosion resistant. Open-head drums of this type are generally provided with a circular rim or chime at the open upper end. Such drums are closed with a separate cover or lid that is clamped to the chime of the drum. Conventionally, the lid is provided with a gasket that engages the chime to form a seal. The gasket is typically made of a synthetic resin that is somewhat softer than the body of the drum and the lid in order to conform exactly to the upper edge of the chime.

Such drums having gasketed lids are generally satisfactory for storage and transportation of materials. However the use of gaskets to form a seal between the lid and the chime has certain drawbacks. The separate manufacture of a gasket requires an assembly step in the manufacture of the drum cover, which increases the cost of manufacture. In some cases the relatively soft gasket material may permit the passage of water vapor through the seal, as well as contaminate the product packaged if it becomes torn or abraded.

Accordingly, a need has continued to exist for a drum lid or cover that does not suffer from the disadvantages of a gasketed drum lid.

SUMMARY OF THE INVENTION

The deficiencies of conventional gasketed drum covers have been alleviated by the gasketless cover of the invention. According to the invention a reusable sealable plastic drum comprises a plastic drum body with a convex upper chime having a convex chime radius, a plastic lid having an annular, peripheral mating channel sized to accept the upper chime, the channel having an inner wall, an outer wall, a mouth for receiving the upper chime, and a base surface for engaging the upper chime, the base surface having a concave radius, which is matched tot he convex chime radius, and a lockband surrounding the outer wall, whereby tightening of the lockband causes the concave base radius to fully engage the convex chime radius in a sealing relationship.

Accordingly, it is an object of the invention to provide a sealable plastic drum.

A further object is to provide a sealable plastic drum having a lid or cover that does not contain a sealing gasket.

A further object is to provide a gasketless sealable plastic drum having good resistance to permeation of water vapor.

A further object is to provide a gasketless sealed drum eliminating the possibility of contamination due to abrasion, tearing, flaking or cutting of gasket material.

Further objects of the invention will be apparent from the description of the invention which follows.

DETAILED DESCRIPTION OF THE INVENTION AND PREFERRED EMBODIMENTS

Figure 1:
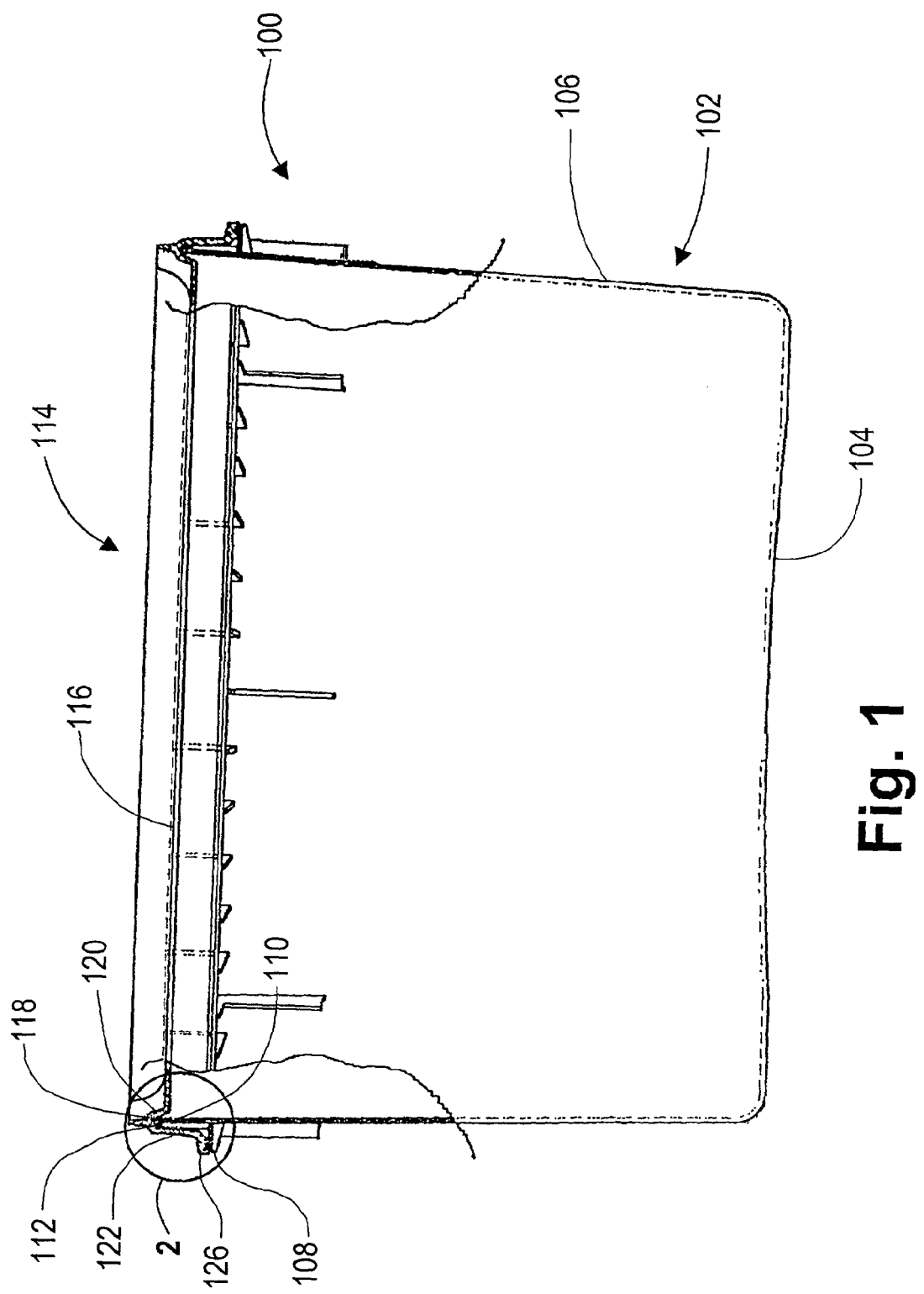
FIG. 1 is a side elevational view, partly cut away, of the drum of the invention.

As shown in FIG. 1, the sealable drum 100 of the invention has a generally cylindrical shape and comprises a generally conventional drum body 102 including a bottom 104 and a wall 106. The wall 106 terminates at its upper end with a chime 110 whose upper surface 112 has a convex curve. A flange 108, extending generally horizontally from the drum wall 106, surrounds the drum 100 a short distance below the chime 110.

The cover or lid 114 of the sealable drum 100 comprises a panel 116 surrounded by a peripheral channel 118 that receives the chime 110 of the drum body 102. The peripheral channel 118 has an inner wall 120, an outer wall 122, and a base 124 having a concave curvature. The lower edge of the outer wall 122 of the peripheral channel 118 is provided with a horizontally extending flange 126 that rests on, or closely approaches, the drum flange 108 when the cover 114 is fitted to the drum body 102. A generally conventional lockband 130 surrounds the drum flange 108 and the cover flange 126. The lockband 130 is tightened by any conventional means, e.g., a lever or toggle, in order to compress the cover flange radially and exert a downward force on the cover in order to seal the drum.

Figure 2:
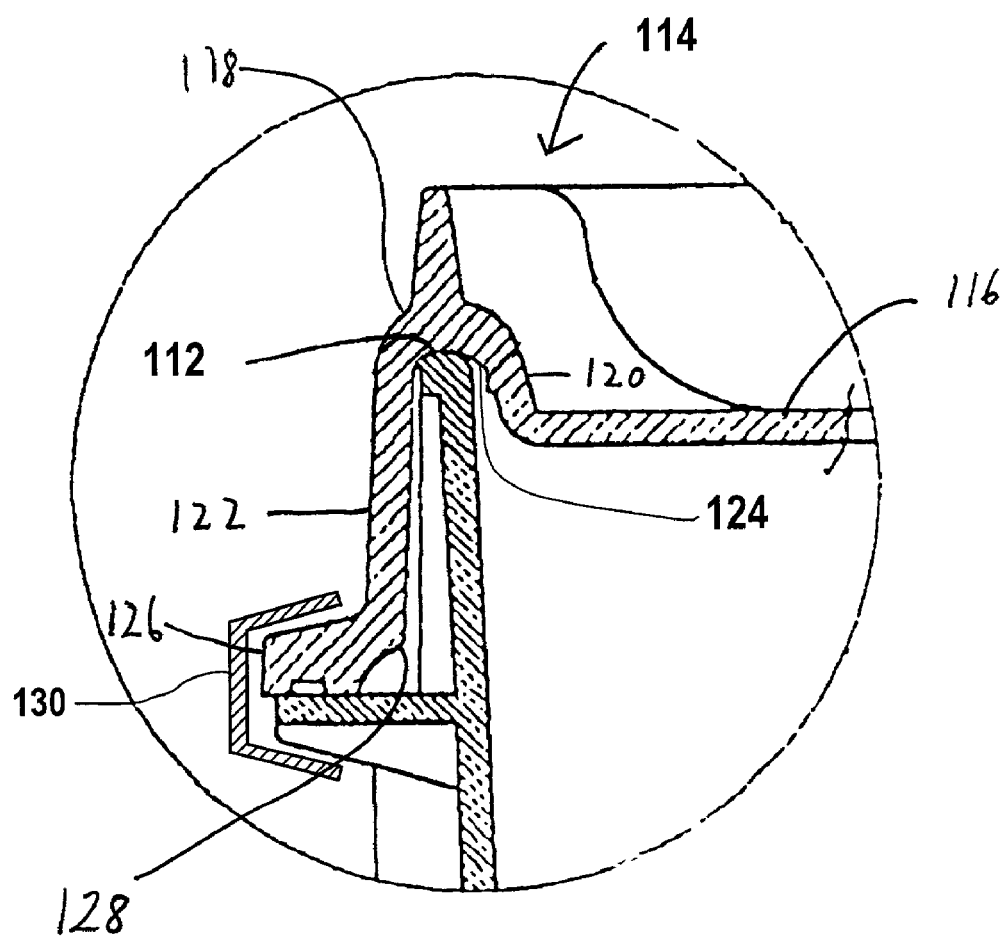
FIG. 2 is a cross-sectional view of the portion of the drum chime and gasketless lid that forms the seal, indicated by the circle 2 in FIG. 1.

According to the invention the relatively soft gasket that is conventionally located at the base 124 of the peripheral channel 118 in order to seal a drum is not used. Instead, as best seen in FIG. 2, the concave curvature of the base 124 of the peripheral channel 118 and the convex curvature of the upper surface 112 of the chime 110 are closely matched. Accordingly, the base 124 of the peripheral channel 118 fits closely against the upper surface 112 of the chime 110 when the lid 114 is fitted to the drum body 102. When the compression band 130 is tightened around the flanges 108 and 126, the drum lid is drawn downward and the outer wall 122 of the peripheral channel 118 is compressed radially inward. This motion causes the base 124 of the peripheral channel 118 to be tightly pressed against the upper surface 112 of the chime 110 with enough pressure to form a seal.

In order to provide a good seal, the width of the top of the chime 110 should be great enough to provide a relatively large area of contact between the upper surface 112 of the chime 110 and the base 124 of the peripheral channel 118. Preferably the width of the top of the chime 110 (top width) is about 0.190 inch (4.83 millimeters). However the skilled practitioner will realize that the width of the top of the chime 110 may be somewhat greater or less than this specific width, so long as the convex curvature of the upper surface 112 of the chime 110 is closely matched to the concave curvature of the base 124 of the peripheral channel 118, and that the width is great enough to provide a satisfactory seal.

Figure 3:
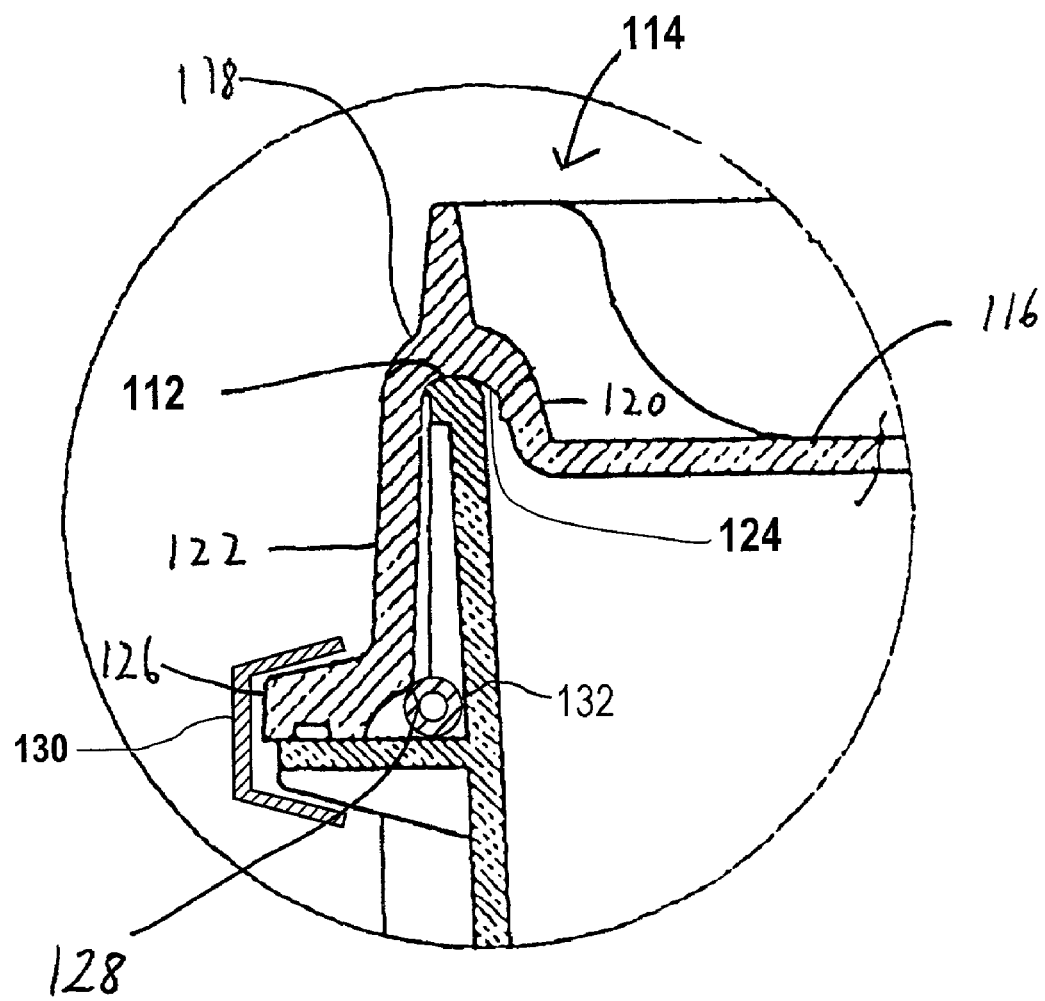
FIG. 3 is a cross-sectional view of another embodiment of the invention incorporating an auxiliary sealing gasket compressed by the heel of the outer wall of the drum lid.

If additional sealing security is desired, the drum may be provided with an auxiliary compressible sealing ring 132, as shown in FIG. 3, located at the inner edge of the drum flange 108. When the lockband 130 is tightened, the heel 128 of the cover compresses the sealing ring 132 to form an additional seal.

The drum and lid of the invention may be made of any suitable plastic material. Synthetic resins such as high-density polyethylene and polypropylene are suitable for making the drum body and lid. The lockband may also be made of a plastic material provided it has sufficient strength to exert the requisite compressive force on the drum flange. A conventional metal lockband can also be used. The drum body 102 and lid 114 can be manufactured by conventional molding techniques suitable for the synthetic resin of which the drum body and lid are made.

The invention having now been fully described, it should be understood that it may be embodied in other specific forms or variations without departing from its spirit or essential characteristics. Accordingly, the embodiments described above are to be considered in all respects as illustrative and not restrictive, the scope of the invention being indicated by the appended claims rather than the foregoing description, and al changes which come within the meaning and range of equivalence of the claims are intended to be embraced therein.

I claim:

1. A reusable sealable plastic drum comprising:
   a plastic drum body with a convex upper chine having a convex radius and with a side wall having a generally horizontal drum flange extending therefrom and disposed below said chine, the drum flange having a substantially planar upper surface;
   a plastic lid comprising:
      a panel;
      an annular, peripheral mating channel sized to accept said upper chine, said channel comprising:
         an inner wall extending generally upward from said panel;
         an outer wall having an upper portion thereof extending above said panel and a lower portion thereof extending below said panel;
         an annular, upwardly protruding lip disposed between said inner wall and said outer wall, said lip being in general alignment with said side wall;
         a mouth for receiving said upper chine, and
         a base surface for engaging said upper chine, said base surface having a concave radius, which is matched to said convex chine radius;
      a cover flange connected to said lower portion of said outer wall and extending radially and outwardly therefrom, wherein said cover flange is disposed below said panel, the cover flange having a lower surface to mate with said upper surface of said drum flange; and
   a lockband engaging said drum flange and said cover flange, wherein tightening said lockband upon said drum flange and said cover flange, downwardly draws said plastic lid, and radially inwardly compresses said outer wall, to cause said concave base surface to be pressed against said convex upper chine with sufficient pressure to cause said concave base surface to directly engage said convex chine in a sealing relationship.

2. The reusable sealable plastic drum of claim 1, additionally comprising:
   a heel disposed between said lower surface of said cover flange and said outer wall; and
   an auxiliary gasket compressable between said heal and said drum flange when said lockband is tightened.

3. The reusable sealable plastic drum of claim 1, wherein said drum body and said lid are made from polypropylene.

4. The reusable sealable plastic drum of claim 1, wherein said upper chine has a top width of about 0.190 inch.

5. The reusable sealable plastic drum of claim 1, wherein said lockband includes metal components.

6. The reusable sealable plastic drum of claim 1, wherein said lockband includes plastic components.

7. A reusable sealable plastic drum comprising:
   a plastic drum body with a convex upper chine having a convex radius and with a side wall having a generally horizontal drum flange extending therefrom and disposed below said chine, the drum flange having a substantially planar upper surface;
   a plastic lid comprising:
      a panel;
      an annular, peripheral mating channel sized to accept said upper chine, said channel comprising:
         an inner wall extending generally upward from said panel;
         an outer wall having an upper portion thereof extending above said panel and a lower portion thereof extending below said panel;
         an annular, upwardly protruding lip disposed between said inner wall and said outer wall, said lip being in general alignment with said side wall;
         a mouth for receiving said upper chine, and
         a base surface for engaging said upper chine, said base surface having a
      concave radius, which is matched to said convex chine radius;
      a cover flange connected to said lower portion of said outer wall and extending radially and outwardly therefrom, wherein said cover flange is disposed below said panel, the cover flange having a lower surface to mate with said upper surface of said drum flange;
   a lockband engaging said drum flange and said cover flange, whereby tightening of said lockband after said lid is fitted to said drum causes said concave base surface to directly engage said convex chine in a sealing relationship;
   a heel disposed between said lower surface of said cover flange and said outer wall; and
   an auxiliary gasket compressable between said heal and said drum flange when said lockband is tightened.

8. The reusable sealable plastic drum of claim 7, wherein said drum body and said lid are made from polypropylene.

9. The reusable sealable plastic drum of claim 7, wherein said upper chine has a top width of about 0.190 inch.

10. The reusable sealable plastic drum of claim 7, wherein said lockband includes metal components.

11. The reusable sealable plastic drum of claim 7, wherein said lockband includes plastic components.

* * * * *

UNITED STATES PATENT AND TRADEMARK OFFICE
CERTIFICATE OF CORRECTION

PATENT NO. : 6,959,831 B2
DATED : November 1, 2005
INVENTOR(S) : Edward M. Maslowski It is certified that error appears in the above-identified patent and that said Letters Patent is hereby corrected as shown below:

Column 3,
Lines 26, 29, 34, 43, 44, 46, 58 and 60, replace "chine" with -- chime --;

Column 4,
Lines 8, 14, 17, 22, 31, 32, 34, 45 and 54, replace "chine" with -- chime --.

Signed and Sealed this

Twenty-fourth Day of January, 2006

JON W. DUDAS
*Director of the United States Patent and Trademark Office*